INVENTORS
James C. Travilla
Thomas R Gilchrist
BY Rodney Bedell
ATT'Y.

April 12, 1955

J. C. TRAVILLA ET AL 2,705,924

RAILWAY TRUCK

Filed July 28, 1949

INVENTORS
James C. Travilla
Thomas R. Gilchrist
By Rodney Bedell
ATTY.

United States Patent Office 2,705,924
Patented Apr. 12, 1955

2,705,924

RAILWAY TRUCK

James C. Travilla, University City, Mo., and Thomas R. Gilchrist, Yeadon, Pa., assignors to General Steel Castings Corporation, Granite City, Ill., a corporation of Delaware Application July 28, 1949, Serial No. 107,348

6 Claims. (Cl. 105—188)

The invention relates to railway vehicles and more particularly to the support of a vehicle body on a six-wheel motor truck, such as embodied in a diesel electric locomotive.

One object of the invention is to provide a lightweight six-wheel motor truck, simple in design, with a short wheel base and low center plate, and with a seperate motor for each wheel and axle assembly.

Another object is to support the vehicle body load on the truck from the truck center plate and from a plurality of bearings on the truck bolster spaced apart transversely of the truck to stabilize the vehicle body against tilting laterally.

Another object is to space the bearings longitudinally from the truck center plate and to distribute the weight of the vehicle body load on the truck center plate and bearings so that a substantially equal load is carried by each wheel and axle assembly and so that friction between the truck bearings and the associated body bearings is sufficient to prevent nosing of the truck, but insufficient to cause derailment of the truck or excessive wheel flange wear as the vehicle rounds a curve.

Another object is to construct the truck bolster of sufficient strength to support the weight of the truck when the vehicle body is jacked up and the truck is suspended from the body underframe.

Another object is to make unnecessary the lubrication of the bearings spaced apart transversely of the truck.

The invention includes arranging the middle wheel and axle assembly so that it is unequally spaced lengthwise of the truck from the end wheel and axle assemblies so that the motor on the middle axle and the motor on the more remote end axle may be positioned between the middle axle and more remote end axle. The truck center plate axis preferably is located on the longitudinal center line of the truck and at the same side of the transverse center line of the truck as the middle axle to space the center plate from the associated motor and thereby provide for a lower center plate with desired clearance between the underside of the bolster and the motor housing for the middle axle. The greater part of the vehicle body load carried by the truck is supported by the truck center plate and the remaining lesser portion of the vehicle body load carried by the truck is supported by the bearings which are at the opposite side of the transverse center line of the truck from the center plate.

The invention by which the above and other detailed objects is attained will be apparent to those skilled in the art from the following description and accompanying drawings, in which.

Figure 1:
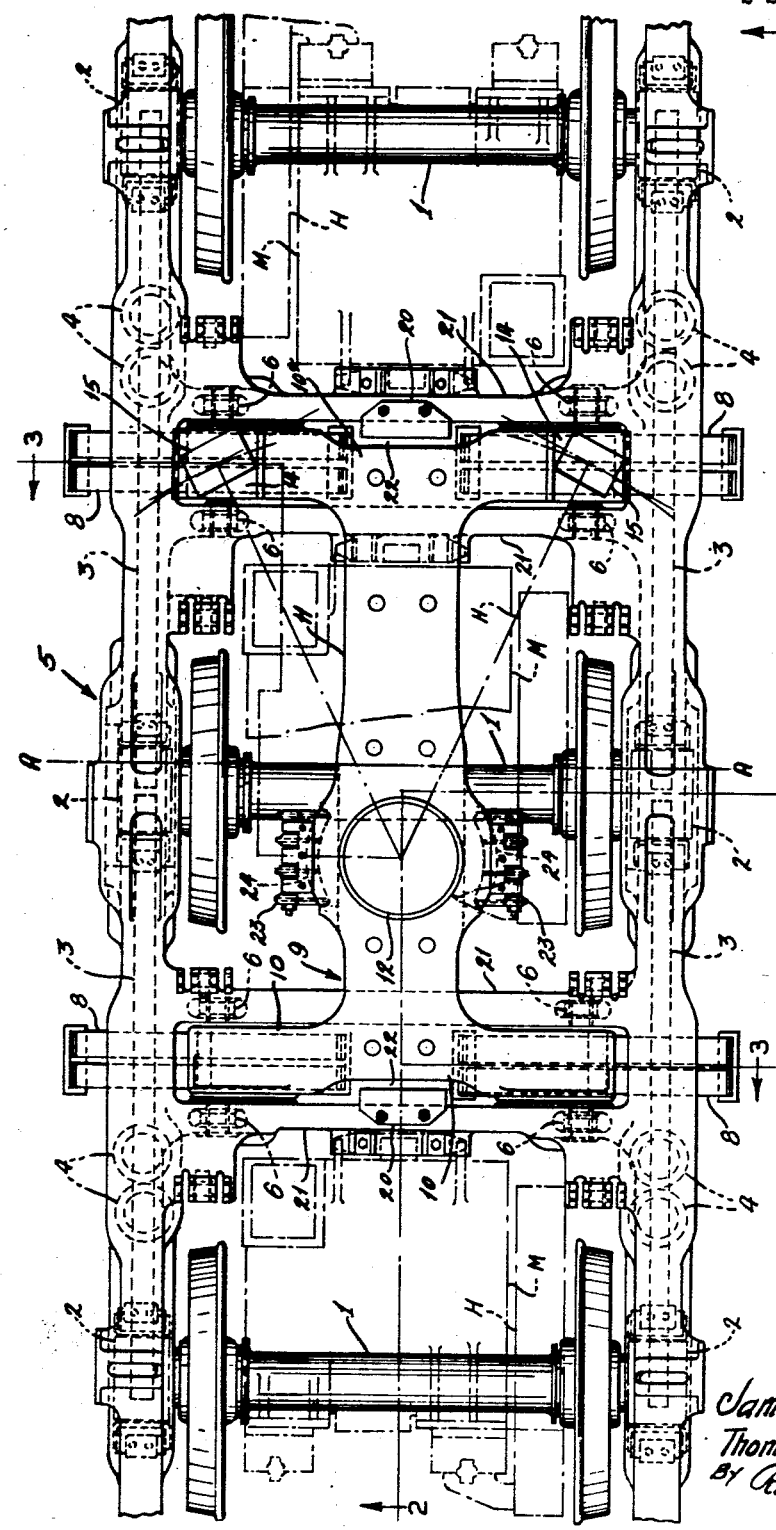
Figure 1 is a top view of a six wheel motor truck constructed according to the invention, end portions being eliminated to increase the scale of the drawing.
Figure 2:
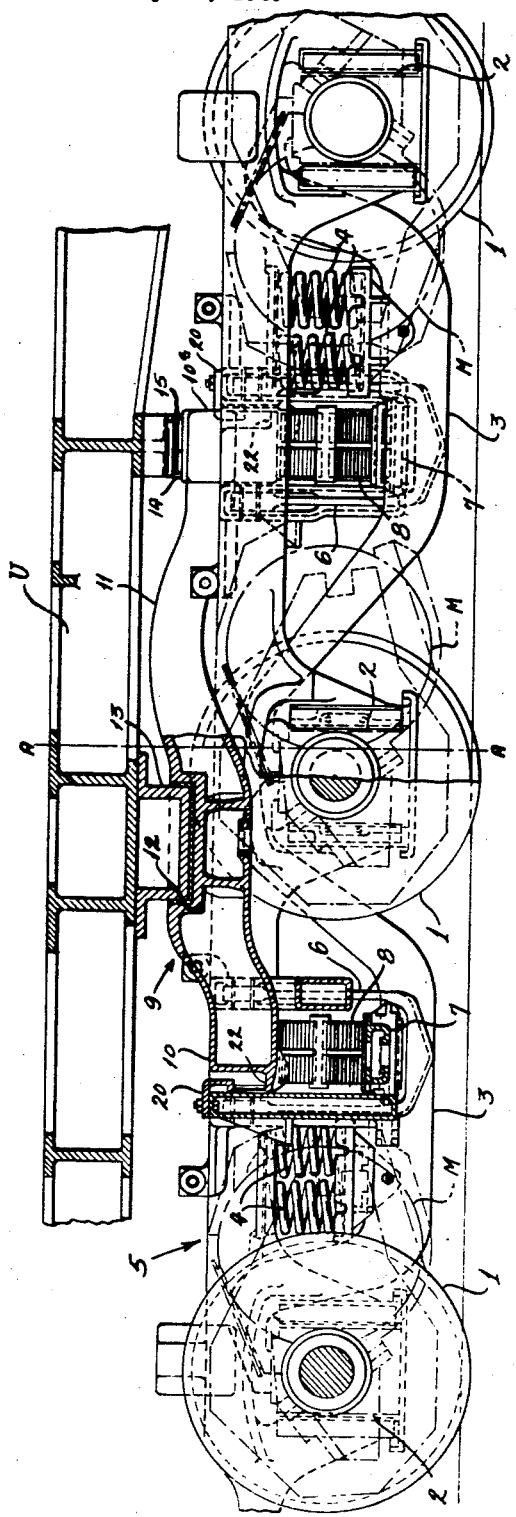
Figure 2 is in part a side view and in part a longitudinal vertical section taken approximately on the line 2—2 of Figure 1 and shows the truck mounting a vehicle underframe.
Figure 3:
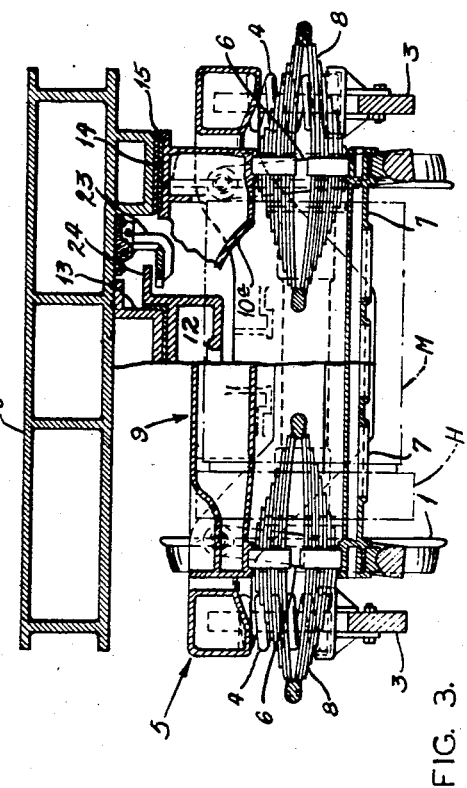
Figure 3 is a transverse vertical section taken approximately on the line 3—3 of Figure 1 and shows the truck mounting a vehicle underframe as in Figure 2.

The truck includes the usual wheel and axle assemblies 1 and journal boxes 2. Each axle carries an electric motor M and a gear housing H. The motor for the left hand axle is positioned between the left hand axle and the middle axle and the motors for the middle axle and for the right hand axle are positioned between the latter axles. The axles are unequally spaced lengthwise of the truck, the middle axle being positioned to the left of the transverse center line A—A of the truck bolster, (Figures 1 and 2). This arrangement accommodates the motors; yet provides for a minimum wheel base as determined by the dimensions of the motors and other truck parts.

Equalizers 3 are mounted on boxes 2 and mount truck springs 4 which carry a truck frame 5. The truck is of the lateral motion bolster type and pairs of swing hangers 6 are suspended from opposite sides of the truck frame at points approximately half way between the middle axle and each end axle. Spring planks 7 extend transversely of the truck and are carried by pairs of swing hangers at opposite sides of the truck and mount bolster springs 8.

A bolster 9 extends longitudinally of the truck and has transverse members 10, 10a positioned at opposite sides of the middle axle and at opposite sides of the transverse center line of the truck, and springs 8 support the bolster near the ends of its parallel transverse members 10, 10a. The bolster has a central longitudinal member 11 extending between transverse members 10, 10a and over the middle axle and its motor M. A center plate 12 on longitudinal member 11 cooperates with a center plate 13 on vehicle body underframe U and supports approximately 80% of the vehicle body load carried by the truck. The cooperating center plates 12, 13 provide for swiveling the truck relative to the vehicle body and transmit traction and brake retardation forces between the truck and body. Truck center plate 12 is closer to transverse member 10 than to transverse member 10a. The vertical axis of the truck center plate is on the longitudinal center line of the truck and to the left of the transverse center line of the truck and at a point approximately one-fourth of the distance from the middle axle to transverse member 10. This arrangement provides clearance between the underside of the bolster and the middle axle motor without raising the center plate to an undesirable height. Gear housings H on the middle axle are at the sides of bolster central member 11 so that the underside of the bolster does not have to be raised to clear the gear housing.

A bearing 14 is positioned near each end of transverse member 10a and preferably is positioned directly above the associated bolster springs 8 and slidingly mounts a bearing 15 on the body underframe. Bearings 14 support approximately 20% of the vehicle body load carried by the truck. The relatively small load carried by bearings 14 makes it unnecessary to lubricate the bearings.

It is usually desirable that the weight of the vehicle body be applied to the truck center plate 12 and the other bearings 15 and be transmitted to the bolster supporting springs and then from the latter to the other truck parts which are so positioned that substantially equal loads are carried by each wheel and axle assembly. Furthermore, in the present arrangement the three supports of the load on the bolster are so positioned on the latter that friction between the engaging bearings on the truck bolster and body is sufficient to prevent nosing of the truck but insufficient to cause derailment of the truck or excessive wheel flange wear as the vehicle rounds a curve. The frictional resistance against swivel action of the truck relative to the vehicle body is dependent upon the proportions of the load applied to the center plate and to the two spaced bearings and to their location spaced from the pivot bearing 12. The center plate itself provides some frictional resistance against swivel actiton. but if the desired frictional resistance were to be obtained from application of the entire load to the center plate. its diameter would have to be enlarged and the center portion of the bolster made more bulky and heavier to obtain clearance over the middle motor. The lateral forces tending to cause nosing are applied between the rails and the wheels on the end axles and other portions of the truck similarly spaced from the center plate. Therefore, to provide effective anti-nosing frictional resistance between the points of support of the vehicle body on the truck bolster and at the same time avoid the disadvantages of heavy bolster design just mentioned and at the same time keep the resistance under that which may cause derailment of the truck or excessive wheel flange wear as the vehicle travels on a curve, bearings 15 are provided to carry a desired proportion of the body load. They also provide for stabilization of the vehicle body against tilting laterally and have other advantages as herein mentioned. Bearings 15 are spaced from the center pivot bearing 12 a distance which maintains a practical truck design, and they form frictional surfaces located at a greater distance from the pivot point than in arrangements in which a single center pivot bearing only is provided, thereby offering more resistance to the lateral forces which tend to cause nosing.

The desired amount of frictional resistance to swivel action is provided by positioning the pivot mounting bearing on the longitudinal center line of the truck between the bolster supporting springs and by positioning bearings 15 in transverse alignment with the bolster springs which support one end of the bolster and spacing them apart transversely of the truck. The arrangement provides for distributing the desired amount of the vehicle body load on the center plate and on the other two bearings; for instance, by positioning the center plate 12 at a particular point which is closer to the bolster supporting springs at the left hand end of the truck than to the springs on the right hand end, approximately 80% of the load would be applied to the truck center plate and 20% to the other two bearings. Shifting the position of the truck center bearing to the left and leaving the other two bearings above the bolster springs on the right hand end would decrease the load on the bolster center plate and increase it on the two other bearings. Shifting the center plate to the right would increase the load on the bolster center plate and decrease the load on the two other bearings until a point would be reached where the entire load would be concentrated at the center plate and no load would be applied to the two other bearings. This latter position would be midway between the bolster springs at the ends of the bolster and the springs on the right hand end if the spring reactions (or in other words, their working loads) at each end are the same. Various proportions of loads on the center plate and the other two bearings could be provided by different spacing of the three bearings, the two transversely spaced bearings, for instance, could be moved to the right or left with or without relocating the center plate. Desired variations in loading on the three bolster bearings could be accomplished even if the bolster support springs were loaded differently and irrespective of whether or not their free height and deflection rate are the same. It may be desirable in certain cases to have differently loaded bolster support springs under the right and left hand ends of the bolster to meet certain design conditions which will provide for a minimum total wheel base in a six wheel truck having the end wheel and axle assemblies spaced different distances from the middle wheel and axle assembly. Furthermore, these latter conditions of bolster spring loads and wheel base may be incorporated in a six wheel truck whether or not the wheel and axle loads are to be equal. The loads on the wheel and axle assemblies are determined by the location of the springs on the equalizers and by the loads applied to the springs from the truck frame. The loads on the equalizer or frame supporting springs are determined by the locations of the points of application of the bolster spring loads to the truck frame in relation to the locations of the points on the frame, where the frame load is transmitted to the equalizer springs.

The three point support on the truck for the vehicle body load provides for a predetermined portion of the load to be applied at all times to each point of support, as distinguished from a four or five point support which may have one or more points free of the load when the car body tilts or weaves relative to the truck bolster. Such a condition would apply undesirable overloads at certain points, requiring heavier or stronger supports to take the overloads, than would be required in a three point support.

The truck bolster is of sufficient strength to support the weight of the truck when the vehicle body is jacked up and the truck is suspended from the body underframe. Any suitable locking devices may be used to prevent vertical separation of the truck bolster and the truck frame and to prevent vertical separation of the truck and body center plates. In the present embodiment, L-shaped members 20 are secured to frame transoms 21 and overlie lugs 22 projecting longitudinally of the truck from transverse bolster members 10, 10a to prevent vertical separation of the truck bolster and truck frame.

The center plate locking device for preventing vertical separation of the body and truck may be substantially as shown and described in application, Serial No. 15,428, filed March 17, 1948, by James C. Travilla, Jr., and Benjamin E. Glenn, Jr., which matured into Patent No. 2,600,704 on June 17, 1952. The locking device includes a pair of horizontally disposed substantially U-shaped members 23 suspended from body underframe U adjacent body center plate 13. Each member 23 normally swings by gravity so that its lower leg underlies a flange 24 on truck center plate 12. The lower leg of member 23 normally is disengaged from flange 24 and engages flange 24 only when center plates 12 and 13 tend to separate from one another.

The truck described above is light in weight and is simple in design and has a relatively short wheel base and a low center plate. The truck bolster and the vehicle body may move transversely of the truck frame and wheel and axle assemblies due to the action of swing hangers 6 and without interfering with the motors.

The details of the invention may be varied substantially without departing from the spirit of the invention and the exclusive use of those modifications coming within the scope of the claims is contemplated.

What is claimed is:

1. In a railway vehicle six wheel truck, a truck frame, pairs of swing hangers pivotally suspended from each side of the truck frame at points spaced longitudinally of the truck, a pair of spring planks extending transversely of the truck and spaced longitudinally of the truck and supported at their ends by said swing hangers, bolster springs mounted near the ends of said spring planks, a bolster including spaced members extending transversely of the truck and a central member extending longitudinally of the truck between said transverse members, said bolster being supported from said bolster springs at points near the ends of its transverse members and being movable by said hangers laterally of the truck, a center plate near one end of said central member, and bearings on said transverse member at the other end of said central member, said bearings being positioned substantially directly above the bolster points of support and cooperating with said center plate for supporting the vehicle body load.

2. In a railway vehicle truck, three wheel and axle assemblies provided with individual driving motors, a truck frame, a bolster supported from said frame, said bolster having a three point support for a vehicle body, one point being on the longitudinal center line of the vehicle and having a pivot mounting for the vehicle body and the other two points being spaced longitudinally of the truck from said pivot mounting and being spaced from each other transversely of the truck, and equalizing bars extending between the middle wheel and axle assembly and each end wheel and axle assembly, and spring structure mounted on each equalizing bar between its ends and supporting the truck frame, said equalizing bars distributing the load on the truck equally to said assemblies during all normal uses of the truck.

3. In a railway vehicle truck, three wheel and axle assemblies, a truck frame supported thereon, a spring plank extending transversely of the truck between the middle assembly and each end assembly with its end portions supported from the truck frame for movement transversely of the truck frame, bolster springs supported by the end portions of said spring planks, a bolster including spaced transverse members, mounted on said springs, and a central member extending longitudinally of the truck between said transverse members, a vehicle body-supporting and body-swiveling element on said bolster central member between the middle assembly and one end assembly, and body-supporting bearings on the bolster transverse member at the more remote end of said central member and spaced from each other transversely of the truck and cooperating with said swiveling element to provide a three point support for the vehicle body at all times during normal operation of the vehicle.

4. In a railway vehicle truck having a middle axle and two end axles and wheels on said axles and having a rigid truck frame spring-supported from said axles and extending alongside said wheels, a bolster including spaced transverse members extending across the truck between the middle axle and the end axles, and also including a central member extending longitudinally of the truck between said transverse members, means supporting the end portions of each of said bolster transverse members from said frame for lateral motion of the bolster relative to the frame, a center plate on said bolster center member positioned nearer to one end of said bolster center member than to the other end of said bolster center member, and bearings on the transverse member at the latter mentioned end of said center member and positioned above the points of support of said latter-mentioned transverse member from the truck frame and cooperating with the center plate for supporting a vehicle body on the truck.

5. In a railway vehicle truck having a middle axle and two end axles and wheels on said axles and a rigid truck frame spring-supported from said axles and extending alongside said wheels, a bolster including spaced transverse members extending across the truck between the middle axle and the end axles, and also including a central member extending longitudinally of the truck between said transverse members, springs supporting the end portions of each of said bolster transverse members from the truck frame, a body-supporting center plate on said bolster center member positioned nearer to one of said transverse members than to the other of said transverse members, and body-supporting bearings on the latter-mentioned bolster transverse member positioned above the points of spring support of said latter-mentioned transverse member, whereby said center plate and bearings cooperate to support a vehicle body with a major portion of the body load carried by the center plate.

6. In a railway vehicle truck, three wheel and axle assemblies, a truck frame supported from said assemblies, a driving motor at one side of each axle and operatively connected thereto and partially supported by said truck frames, a bolster including a transverse member extending across the truck between each pair of adjacent motors and between the middle axle and each end axle, said bolster including a central longitudinal member extending from one of said transverse members to the other and over the motor associated with the middle axle, means between successive motors and between the middle axle and each end axle supporting said bolster transverse members from said truck frame for relative movement of the bolster transversely of the truck, a body-supporting center plate on said bolster central member with its vertical axis positioned nearer to one of said transverse members than to the other transverse member and at the side of the middle axle opposite to the motor connected to the middle axle but spaced from the motor on the adjacent end axle, and two body-supporting bearings on the bolster transverse member at the other side of the middle axle and adjacent to the sides of the truck, whereby said center plate and bearings cooperate with one another for supporting a vehicle body with a major portion of the body load carried by the center plate.

References Cited in the file of this patent

UNITED STATES PATENTS

| | | |
|---|---|---|
| 311,553 | Wilson | Feb. 3, 1885 |
| 975,303 | Vauclain | Nov. 8, 1910 |
| 1,502,988 | Goodwin | July 29, 1924 |
| 1,503,847 | Pilcher | Aug. 5, 1924 |
| 1,757,323 | McCullough | May 6, 1930 |
| 1,893,032 | McGrew | Jan. 3, 1933 |
| 1,895,500 | Todd | Jan. 31, 1933 |
| 1,948,250 | Wintemberg | Feb. 20, 1934 |
| 2,252,382 | Lanning | Aug. 12, 1941 |

FOREIGN PATENTS

| | | |
|---|---|---|
| 876,205 | France | Oct. 30, 1942 |
| 147,652 | Switzerland | June 15, 1931 |